(12) United States Patent
Sumcad et al.

(10) Patent No.: US 9,299,250 B1
(45) Date of Patent: Mar. 29, 2016

(54) PROCESSING REQUESTS TO ESTABLISH COMMUNICATION SESSIONS IN A MOBILE VEHICLE COMMUNICATION SYSTEM

(71) Applicant: General Motors LLC, Detroit, MI (US)

(72) Inventors: Anthony J. Sumcad, Troy, MI (US); Kyle M. Ellard, Farmington Hills, MI (US); Christopher Lucarelli, Rochester Hills, MI (US); Matthew R. Waldner, Gross Pointe Woods, MI (US); Shawn F. Granda, Novi, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 14/510,927

(22) Filed: Oct. 9, 2014

(51) Int. Cl.
*G08G 1/00* (2006.01)
*G08G 1/16* (2006.01)

(52) U.S. Cl.
CPC ... *G08G 1/00* (2013.01); *G08G 1/16* (2013.01)

(58) Field of Classification Search
CPC .............................................. G08G 1/00–1/22
See application file for complete search history.

(56) References Cited

U.S. PATENT DOCUMENTS

2013/0147616 A1\* 6/2013 Lambert ................ G07C 5/008
340/426.1

\* cited by examiner

*Primary Examiner* — Raymond Dean
(74) *Attorney, Agent, or Firm* — Christopher DeVries; Reising Ethington P.C.

(57) ABSTRACT

A method of processing requests to establish wireless communication sessions in a mobile vehicle communications system. The method comprises receiving a request to establish a communication session between a telematics unit of a vehicle and a remote facility, wherein the request takes the form of one or more electrical signals. The method further comprises determining whether less than a predetermined number of requests to establish a communication session between the telematics unit and remote facility have been received from the sender of the request within a predetermined period of time. When it is determined that less than the predetermined number of requests have been received from the sender within the predetermined period of time, the method still further comprises establishing a communication session between the telematics unit and the remote facility. A system for performing or utilizing the above-described methodology is also provided.

20 Claims, 6 Drawing Sheets

PROCESSING REQUESTS TO ESTABLISH COMMUNICATION SESSIONS IN A MOBILE VEHICLE COMMUNICATION SYSTEM

TECHNICAL FIELD

The present invention relates generally to wireless communication in mobile vehicle communications systems and, more specifically, to processing requests to establish communication sessions in such systems.

BACKGROUND

Modern vehicles often include a vehicle communication platform (VCP) or telematics unit that enables wireless voice and/or data communications between the vehicle and a remote facility, for example, a call center. Such communication between the vehicle and a remote facility enables the provision of a number of services including those related to navigation, telephony, emergency assistance, diagnostics, infotainment, etc.

Communication between a telematics unit of a vehicle and a remote facility may be initiated either at the vehicle or the remote facility, and such communication may be initiated by one of the telematics unit or remote facility sending the other a request to establish a communication session. The recipient of the request may then send a response back to the sender effectively establishing the communication session. Once a communication session is established, resources at the remote facility (e.g., live advisors) may be devoted or assigned to provide whatever assistance or service is needed by or to the vehicle (or its occupants).

In certain circumstances, requests to establish a communication session between the telematics unit and remote facility may be unintentionally and automatically sent from the telematics unit to the remote facility, or vice versa. For example, following a collision, or as a result of another triggering event, the telematics unit may malfunction and be "stuck" in a state wherein requests are repeatedly (and excessively) sent to the remote facility even though assistance or a service provided by the remote facility is not required. However, the remote facility is not aware of the telematics unit malfunction and does not know that the repeated requests received therefrom were unintentionally initiated. As such, a communication session is unnecessarily established and resources at the remote facility unnecessarily devoted or assigned in response to each received request.

SUMMARY

According to an embodiment of the invention, there is provided a method of processing requests to establish wireless communication sessions in a mobile vehicle communications system. The method comprises: receiving a request to establish a communication session between a telematics unit of a vehicle and a remote facility, wherein the request takes the form of one or more electrical signals; determining whether less than a predetermined number of requests to establish a communication session between the telematics unit and remote facility have been received from the sender of the request within a predetermined period of time; and establishing a communication session between the telematics unit and the remote facility when it is determined that less than the predetermined number of requests have been received from the sender within the predetermined period of time.

In accordance with another aspect of the invention, there is provided a system for processing requests to establish wireless communication sessions in a mobile vehicle communications system. The system comprises: an electronic processor having an electrical input for receiving a request to establish a communication session between a telematics unit of a vehicle and a remote facility, wherein the request takes the form of one or more electrical signals; and an electronic memory device electrically coupled to the electronic processor and having instructions stored therein. The electronic processor is configured to access the memory device and execute the instructions stored therein such that it is operable to: determine whether less than a predetermined number of requests to establish a communication session between the telematics unit and the remote facility have been received from the sender of the request within a predetermined period of time; and establish a communication session between the telematics unit and the remote facility when it is determined that less than the predetermined number of requests have been received from the sender within the predetermined period of time.

According to yet another embodiment of the invention, there is provided a method of processing requests to establish wireless communication sessions in a mobile vehicle communications system. The method comprises: receiving a request to establish a communication session between a telematics unit of a vehicle and a remote facility, wherein the request takes the form of one or more electrical signals; processing the received electrical signal(s) to determine an identifier corresponding to the sender of the request; determining whether a particular number of requests to establish a wireless communication session between the telematics unit and the remote facility have been received from the sender within a predetermined period of time; and identifying the sender as a sender for which communication sessions should not be established and storing the identifier corresponding thereto in an electronic memory device when it is determined that the particular number of requests have been received from the sender within the predetermined period of time.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The methods and systems described below may be used to process requests to establish wireless communication sessions between a telematics unit of vehicle and a remote facility that are both part of a mobile vehicle communications system. More specifically, the methods and systems allow for a determination to be made as to whether a communication session should be established in response to a request to establish such a communication session; or alternatively, whether the request should be disregarded or other action taken in response to the request. In addition, the methods and systems allow for the identification of a given sender of communication requests as a sender for or with which communication sessions should not be established as a result of an excessive number of requests being received by that particular sender.

Communications System—

Figure 1:
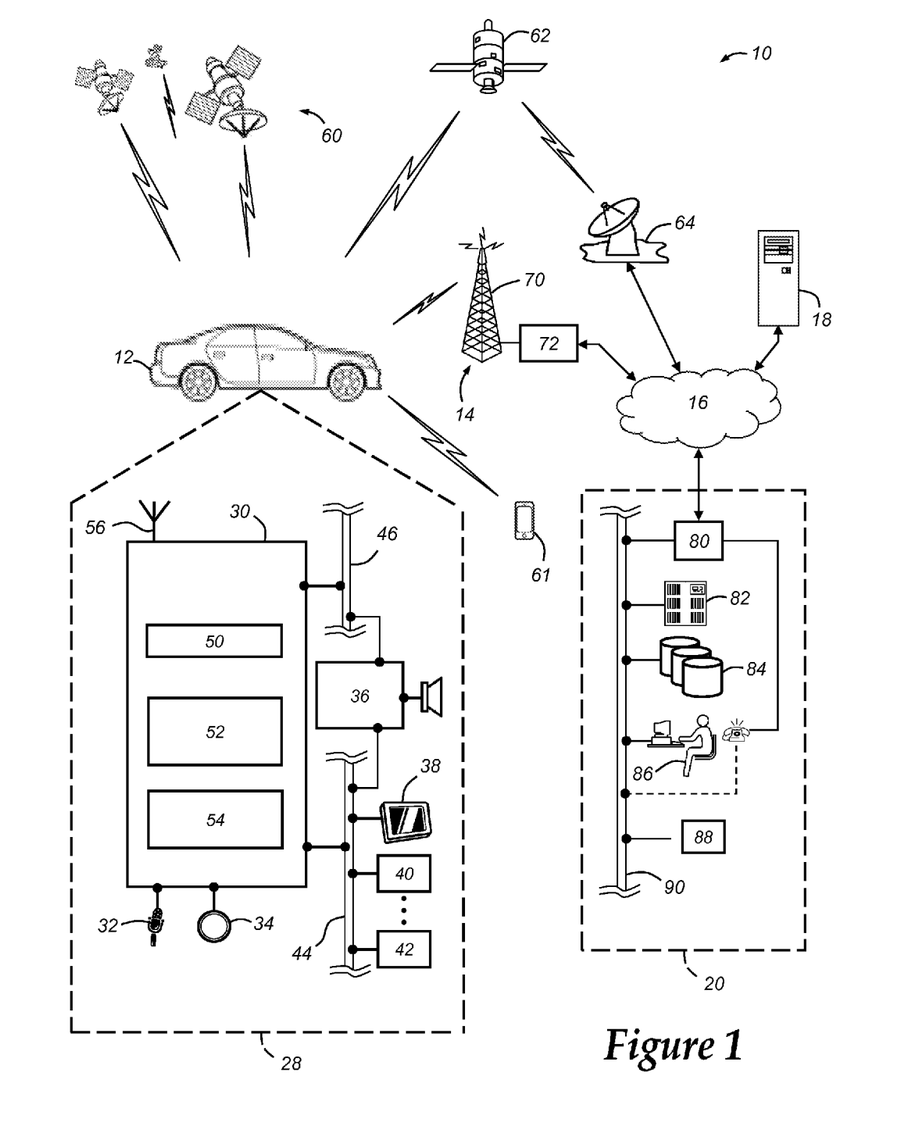
FIG. 1 is a block diagram depicting an embodiment of a mobile vehicle communications system that is capable of utilizing or performing the method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that is installed in the vehicle and that enables wireless voice and/or data communication over wireless carrier system 14 and via wireless networking. This enables the vehicle to communicate with a remote facility, for example, call center 20, other telematics-enabled vehicles, or some other entity or device. Telematics unit 30 preferably uses radio transmissions to establish a communications channel (a voice channel and/or a data channel) with wireless carrier system 14 so that voice and/or data transmissions can be sent and received over the channel. By providing both voice and data communication, telematics unit 30 enables vehicle 12 to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to, for example, GSM, CDMA, or LTE (e.g., LTE 4G) standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in telematics unit 30 (e.g., memory device 54) and is executed by processor 52, or it can be a separate hardware component located internal or external to telematics unit 30. The modem can operate using any number of different standards or protocols such as EVDO, CDMA, GPRS, EDGE, and LTE. When used for packet-switched data communication such as TCP/IP, telematics unit 30 can be configured with a static IP address or can be set up to automatically receive an assigned IP address from another device on the network such as a router or from a network address server.

Wireless networking between the vehicle and other networked devices can also be carried out using telematics unit 30. For this purpose, telematics unit 30 can be configured to communicate wirelessly according to one or more wireless protocols. Examples of wireless networks include both cellular networks (as previously described) but also short range wireless communication (SRWC). SWRC is intended to be construed broadly and may include one or more suitable wireless protocols including: any Wi-Fi standard (e.g., IEEE 802.11); Wi-Fi Direct, Bluetooth, or other suitable peer-to-peer standard; wireless infrared transmission; WiMax; ZigBee™; and/or various combinations thereof. This list is merely meant to provide examples and is not intended to be limiting.

Telematics unit 30 may have an identifier or identification number associated therewith or corresponding thereto that is unique to the telematics unit. This identifier may comprise numeric character(s), alphabetic character(s), or a combination of numeric and alphabetic character(s) (i.e., alphanumeric). Depending on the particular implementation, the identifier may comprise, for example, a mobile station international subscriber directory number (or MSISDN), a station identifier (or STID), a mobile directory number (or MDN), or any other suitable identifier. When establishing a communication session with another networked device, telematics unit 30 may send one or more electrical signals that are representative of the identifier corresponding to the telematics unit to allow the recipient (i.e., the device with which the telematics unit wishes to communicate) to determine the identity of the telematics unit. For example, in an instance where telematics unit 30 initiates communication with a remote facility (e.g., call center 20), telematics unit 30 may send the remote facility a request to establish a communication session that includes the identifier corresponding to the telematics unit such that the remote facility can identify the source of the request. In such an example, the request may comprise one or more electrical signals containing packetized data that includes the identifier corresponding to telematics unit 30 and, in at least certain instances, additional information relating to, for example, the telematics unit or the vehicle (e.g., the reason for the requested communication session, the location of the vehicle, etc.). The identifier may be stored in the memory 54 or in another suitable electronic memory device that is accessible by, for example, processor 52.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable telematics unit 30 to provide a wide variety of services. For instance, processor 52 can execute programs or process data to carry out at least a part of the method discussed herein.

Telematics unit 30 can be used to provide a diverse range of vehicle services, some of which involve wireless communication to and/or from the vehicle. These services may include, for example: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, module 40 can determine vehicle position that is used for providing navigation and other position-related services to the vehicle driver. Navigation information can be presented on display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to GPS module 40 from call center 20 via telematics unit 30.

Apart from audio system 36 and GPS module 40, vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 may be a powertrain control module that regulates operation of one or more components of the vehicle powertrain, and another VSM 42 can be a body control module that governs various electrical components located throughout the vehicle, like the vehicle's power door locks, horn, and lights (e.g., headlights, brake lights, interior lights, etc.). As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on vehicle 12 and enables a vehicle user to communicate with or through a component of vehicle 12. Microphone 32 provides audio input to the telematics unit to enable the driver or other occupant to provide voice commands and carry out hands-free calling via the wireless carrier system 14. Alternatively, microphone 32 may provide audio input to the telematics unit to enable the driver or other occupant to provide voice commands and carry out hands-free calling and other functionality (e.g., hands-free text messaging) via the wireless carrier network to which a mobile device 61 is connected, which may or may not comprise wireless carrier system 14. For these purposes, microphone 32 can be connected to an on-board automated voice processing unit utilizing human-machine interface (HMI) technology known in the art. Pushbutton(s) 34 allow manual user input into the telematics unit 30 to initiate wireless telephone calls and provide other data, response, or control input. Separate pushbuttons can be used for initiating emergency calls versus regular service assistance calls to call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or digital technologies such as CDMA (e.g., CDMA2000), GSM/GPRS, or LTE. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with vehicle 12 or call center 20, or both. A computer 18 can also be used for providing Internet connectivity such as DNS services or as a network address server that uses DHCP or other suitable protocol to assign an IP address to vehicle 12, and telematics unit 30 thereof, in particular. In an embodiment, computer 18 may be configured to perform some or all of the steps of the method described below; while in other embodiments, computer 18 may have no involvement with the method.

Call center 20 is designed to provide the vehicle electronics 28 with a number of different system back-end or back office functions and, according to the illustrative embodiment shown in FIG. 1, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming electrical signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, lists or logs relating to vehicle identifiers, profile records, behavioral patterns, and other pertinent information, for example, that required to perform the methodology describe below. Data transmissions may also be conducted by wireless systems, such as 802.11x, GPRS, and the like.

Server 82 may be configured to perform any number of functions, including, in an embodiment, some or all of the steps of the methodology described below. More specifically, and as known in the art, server 82 may include an electronic processing device and an electronic memory device electrically coupled to and accessible by the processing device. In another embodiment, the database 84 may comprise the memory device of server 82, and therefore, server 82 may not include a separate memory. In any event, the memory device can have digitally-stored instructions, such as software or firmware programs and/or other information stored thereon, some or all of which may be required to perform some or all of the steps of the method described below. The processing device can be any type of device capable of processing electronic instructions including microprocessors, microcontrollers, host processors, controllers, vehicle communication processors, and application specific integrated circuits (ASICs). The processing device executes various types of digitally-stored instructions, such as software or firmware programs stored in the memory device, which enable the processing to perform some or all of the steps of the method described below.

Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

In addition to the above, the operating environment may further include one or more other vehicles (e.g., similar to vehicle 12 having telematics capability) and/or, as briefly described above, one or more mobile devices 61. Generally, the mobile device may be an electronic device which may be used to make mobile telephone calls across a wide geographic area where transmissions are facilitated by the wireless carrier system 14 (i.e., when the mobile device is connected to the wireless carrier system); but of course, this is merely an example. Other examples include short-range wireless communication, e.g., via Bluetooth, Wi-Fi, Wi-Fi Direct, etc. Non-limiting examples of the mobile device 61 include a cellular telephone, a personal digital assistant (PDA), a Smart phone, a personal laptop computer or tablet computer having two-way communication capabilities, a netbook computer, a notebook computer, or any suitable combinations thereof. It should be appreciated that the mobile device 61 may communicate (e.g., transmit/receive) wirelessly with telematics unit 30 via cellular communication, a SRWC link, or both.

Method—

Figure 2:
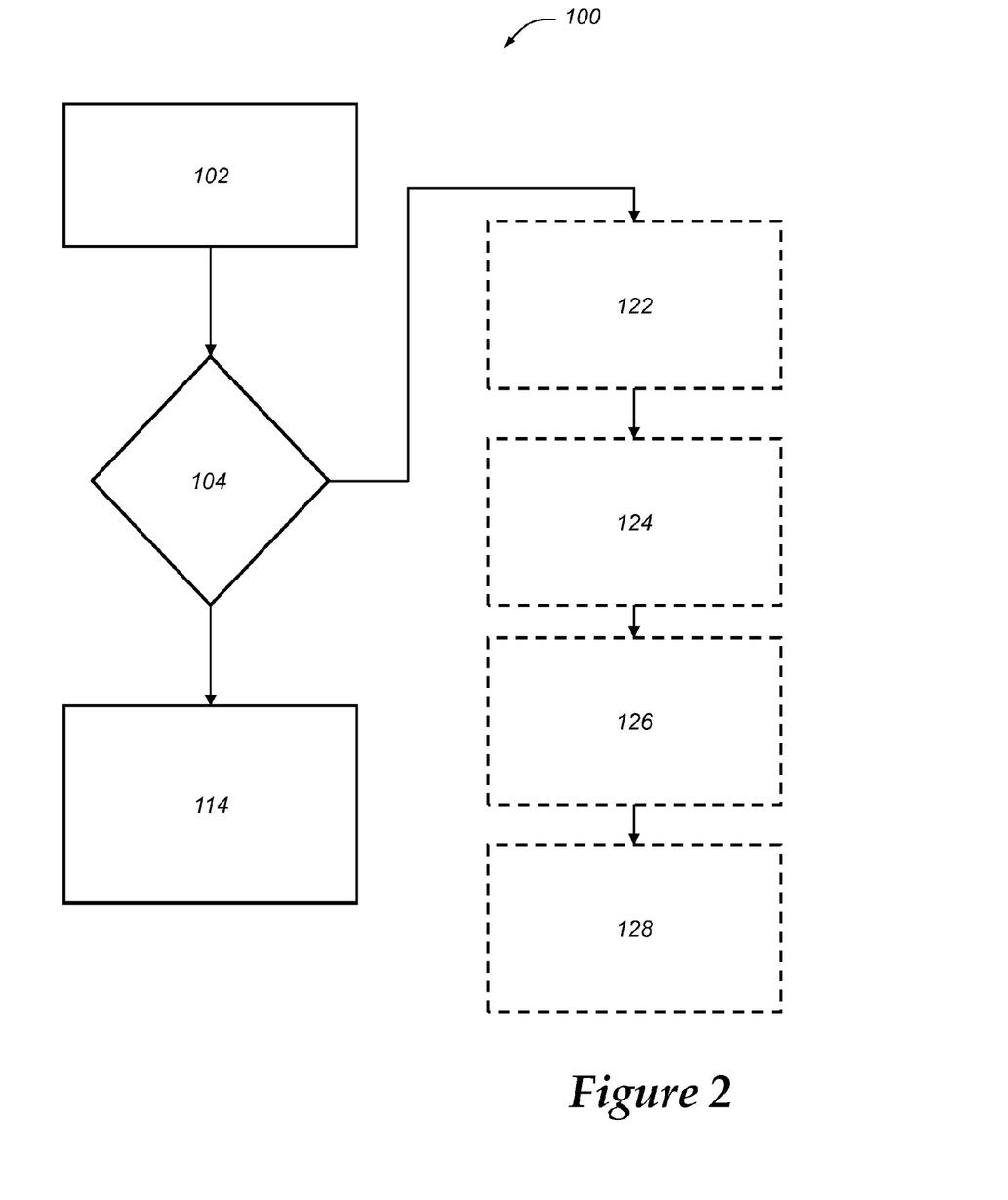
FIGS. 2-6 are flow charts depicting various steps of illustrative embodiments of a method of processing requests to establish communication sessions in a communications system such as that illustrated in FIG. 1.

Turning now to FIG. 2, there is shown a method 100 of processing requests to establish wireless communication sessions in a mobile vehicle communications system. More particularly, in an embodiment, method 100 comprises a method processing requests to establish wireless communication sessions between a vehicle (e.g., a telematics unit of the vehicle) and a remote facility, which may comprise, for example, a call center or another back office component of the communications system. For purposes of illustration, method 100 will be described below in the context of mobile vehicle communications system 10 described above and illustrated in FIG. 1, and particularly in the context of processing requests to establish communication sessions between telematics unit 30 of vehicle 12 and a remote facility, such as, for example and without limitation, call center 20. It will be appreciated, however, that the methodology may also find application in communications systems other than communications system 10, as well as with respect to establishing communication sessions between telematics unit 30 and other remote facilities of system 10, such as, for example, and without limitation, computer 18 or another suitable component. Additionally, it will be appreciated that unless otherwise noted, the performance of method 100 is not intended to be limited to any one particular order or sequence of steps, or to any particular component(s) for performing the steps.

In an embodiment, method 100 comprises a step 102 of receiving a request to establish a communication session (e.g., a voice and/or data channel) between telematics unit 30 and call center 20. A communication session may be initiated at either telematics unit 30 or call center 20, and therefore, the request to establish a communication session may be generated by telematics unit 30 and received by center 20 in step 102, or vice versa. For example, in an embodiment, telematics unit 30 is configured to generate a request to establish a communication session with call center 20, and to electronically send it to call center 20 where it is ultimately received by, for example, server 82 or another suitable component. In such an embodiment, the request may take the form of a vehicle identification (or VID) packet containing, for example, an identifier unique to telematics unit 30, the reason for which a connection is being requested, and/or other vehicle-centric details (e.g., location information (latitude and longitude), etc.). Alternatively, in another embodiment, call center 20 is configured to generate a request to establish a communication session with telematics unit 30, and to electronically send it to telematics unit 30 which receives the request. In such an embodiment, the request may take the form of a short message service (SMS) message or the like that, for example, prompts telematics unit 30 to send a VID packet back to call center 20. In either embodiment, the request may take the form of one or more electrical signals that may be communicated via, for example and without limitation, wireless carrier system 14.

Following the receipt of the request in step 102, method 100 may proceed to a step 104 of determining whether less than a predetermined number of requests to establish a communication session between vehicle 12 and call center 20 have been received from the sender of the request (e.g., either telematics unit 30 or call center 20) within a predetermined period of elapsed time. Both the predetermined number of requests and the predetermined period of elapsed time may be programmed into a suitable memory device of the component configured to perform step 104 (e.g., memory 54 of telematics unit 30, database 84 of call center 20, a memory device associated with server 82, etc.), with the predetermined number of requests representing the number of requests that, if received from a single sender within the predetermined period of elapsed time, would be considered to be excessive. For example, in one non-limiting implementation, the predetermined number of requests is "100" and the predetermined period of elapsed time is "60 minutes." In this implementation, if, as a result of the request received in step 102, more than 100 requests have been received from the sender within the immediately preceding 60 minutes, the sender will be considered to have sent an excessive number of requests. It will be appreciated that the example described above is provided for illustrative purposes only and that in other implementations, other value(s) of the predetermined number of requests and/or the predetermined period of elapsed time may be utilized.

Figure 3:
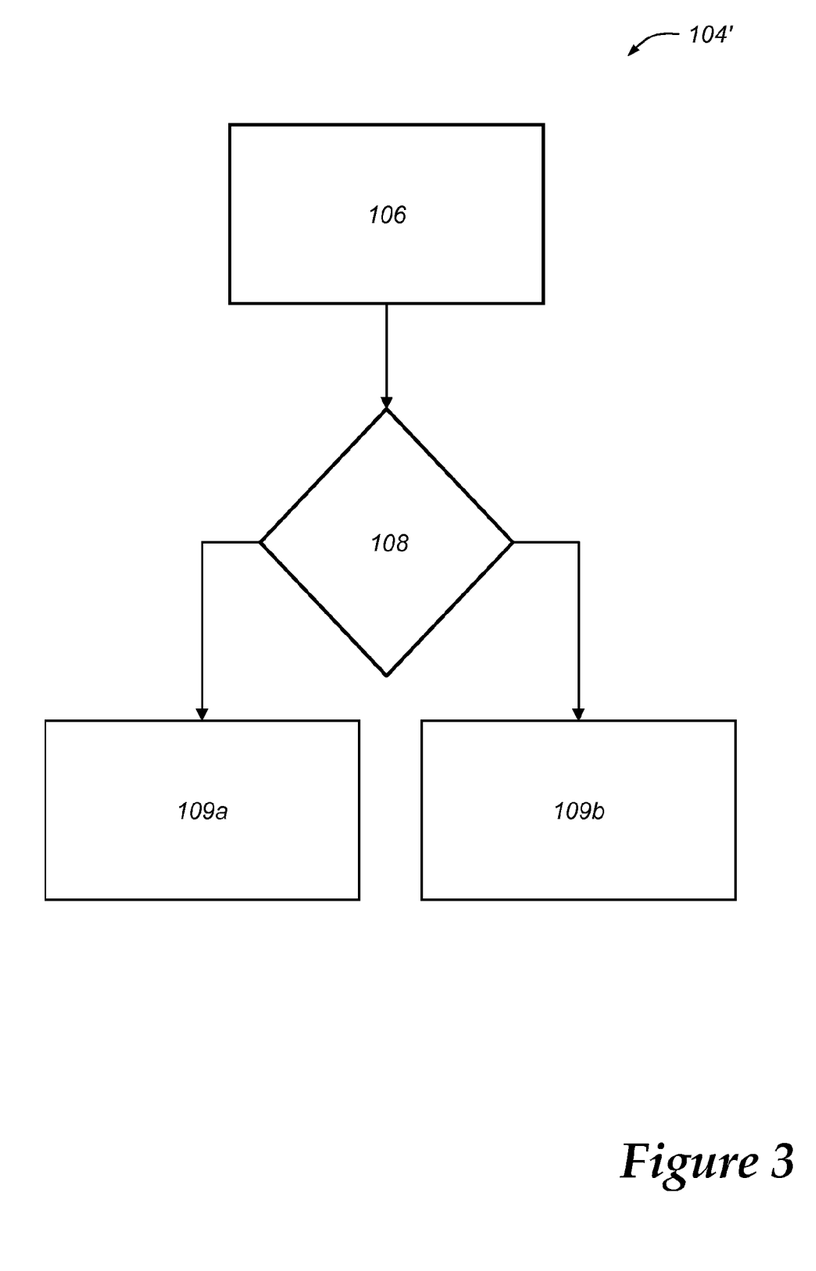

In any event, step 104 may be performed in a number of ways. One example is that illustrated in FIG. 3. In this example, step 104 (i.e., step 104') includes a first substep 106 of processing the electrical signal(s) received in step 102 to determine or extract an identifier or identification number that corresponds and is unique to the sender of the request that will allow the recipient to determine the identity of the sender. The identifier may comprise alphabetic, numeric, or a combination of alphabetic and numeric (i.e., alphanumeric) character(s), and may take any number of forms known in the art, including, but not limited to, a MSISDN, MDN, STID, or any other suitable identifier. Once the identifier is determined in substep 106, step 104 may comprise a second substep 108 of comparing the identifier to one or more identifiers stored in an electronic memory device that is part of or accessible by the particular component configured to perform step 104. The stored identifiers correspond to one or more senders (e.g., telematics units or remote facilities, depending on the particular implementation) from which at least the predetermined number of requests to establish a communication session have been received within the predetermined period of elapsed time. In other words, the stored identifiers correspond to senders that have sent an excessive number of requests, and therefore, senders for or with which communication sessions should not be established. If it is determined in substep 108 that the identifier corresponding to the sender of the request received in step 102 does not match any of the stored identifiers, it can be further determined in a substep 109a that less than the predetermined number of requests have been received from the sender within the predetermined period of elapsed time. Conversely, if it is determined in substep 108 that the identifier matches one of the stored identifiers, it can be further determined in a substep 109b that more than the predetermined number of requests have been received from the sender within the predetermined period of elapsed time.

Figure 4:
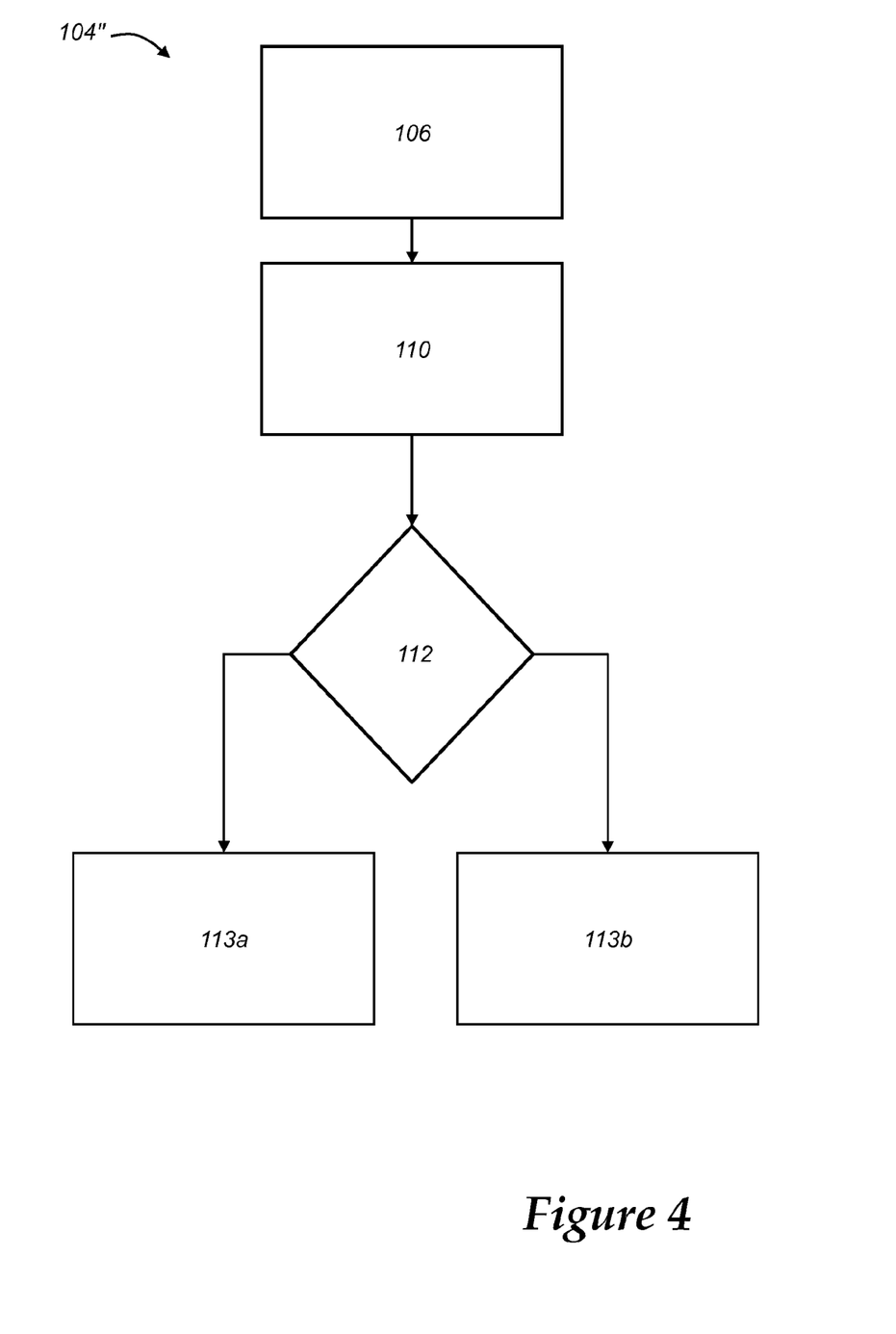

Another way in which step 104 may be performed is that illustrated in FIG. 4. In this example, step 104 (i.e., step 104") again includes substep 106 of processing the electrical signal(s) received in step 102 to determine or extract an identifier or identification number corresponding to the sender of the request that will allow the recipient of the request to determine the identity of the sender. Once the identifier is determined in substep 106, step 104 may comprise a substep 110 of logging the request in a log or list stored in or on the electronic memory device that is part of or accessible by the component configured to perform step 104, and that contains previously logged requests received from the same sender within the predetermined period of elapsed time. The total number of logged requests may then be compared to the predetermined number of requests in a substep 112. And if it is determined in substep 112 that the total number of logged requests is less than the predetermined number of requests, then it can be further determined in a substep 113a that less than the predetermined number of requests have been received from the sender within the predetermined period of elapsed time; while if it is determined in substep 112 that the total number of logged requests exceeds (or, in an embodiment, meets or exceeds) the predetermined number of requests, it can be further determined in a substep 113b that more than (or at least) the predetermined number of requests have been received from the same sender within the predetermined period of elapsed time.

While two particular ways for performing step 104 have been described in detail above, it will be appreciated that any number of alternative ways may be used instead. Accordingly, the present disclosure is not intended to be limited to any particular way(s) of determining whether less than a predetermined number of requests to establish a communication session between the telematics unit and remote facility have been received within a predetermined period of time. Additionally, the particular component that is configured to perform step 104 (and the substeps thereof) is implementation-dependent. For example, in an implementation wherein telematics unit 30 is the sender and call center 20 is the recipient of the request received in step 102, step 104 may be performed by a component of call center 20, for example, server 82 or another suitable component thereof. Alternatively, in an implementation wherein call center 20 is the sender and telematics unit 30 is the recipient, step 104 may be performed by a component of telematics unit 30, for example, processing device 52. Accordingly, it will be appreciated that step 104 may be performed by any number of components, and thus, the present disclosure is not limited to any particular component(s) for doing so.

How method 100 proceeds following step 104 is dependent upon the determination made in step 104. More particularly, and as illustrated in FIG. 2, if it is determined in step 104 that less than the predetermined number of requests have been received from the sender within the predetermined period of time, method 100 may proceed to a step 114 of establishing a communication session between the telematics unit and remote facility. In some implementations, step 114 may comprise the recipient of the request received in step 102 sending one or more electrical signals to the sender of the request that serve(s) to facilitate the establishment of the communication session. For example, in an implementation wherein telematics unit 30 is the sender of the initial request and therefore call center 20 receives the request in step 102, call center 20 may send one or more electrical signals to telematics unit 30 to facilitate the establishment of a communication session therebetween. Alternatively, in an implementation wherein call center 20 is the sender of the initial request and therefore telematics unit 30 receives the request in step 102, telematics unit 30 may send one or more electrical signals to call center 20 to facilitate the establishment of a communication session therebetween. In either instance, step 114 may comprise sending a dynamic number allocation (DNA) to the sender of the initial request which serves to establish the communication session; though the present disclosure is not intended to such an embodiment, but rather other means or techniques for establishing a communication session may be used instead.

Figure 5:
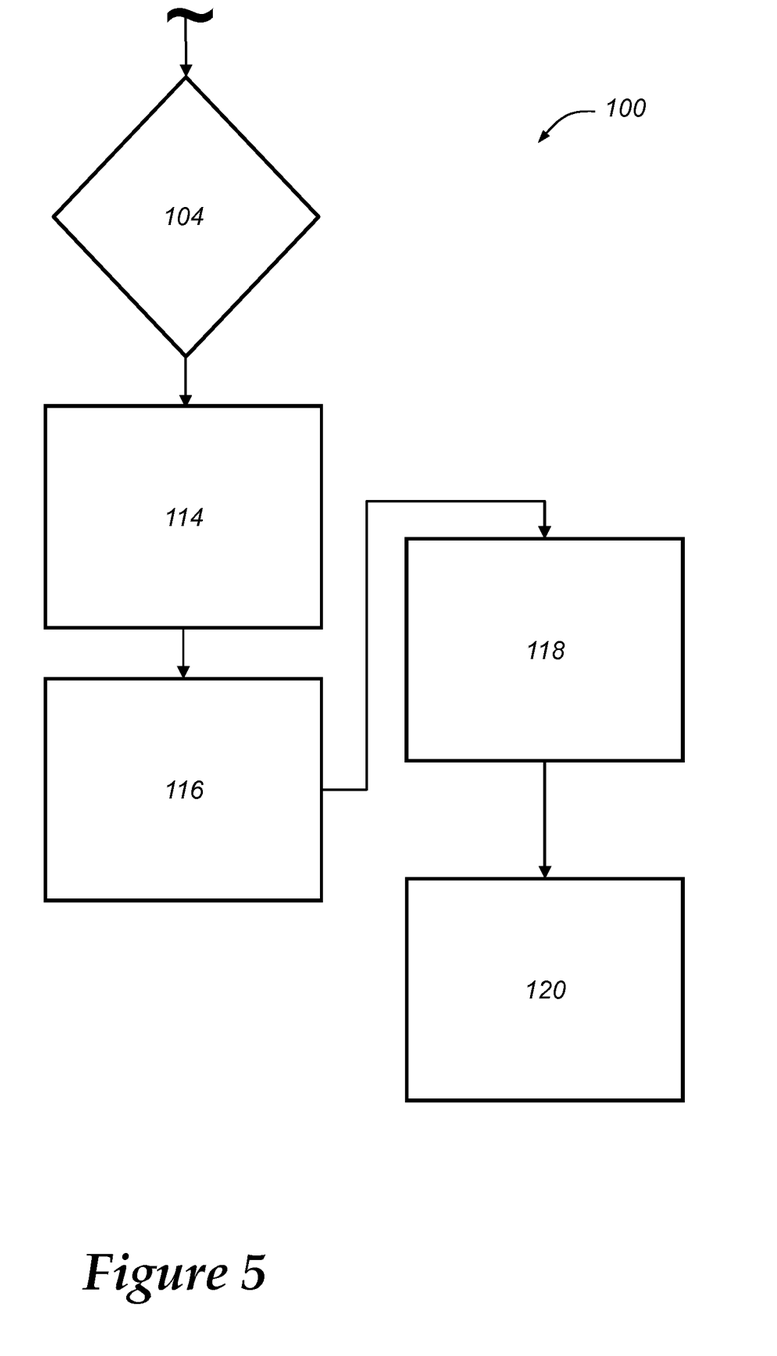

In an instance wherein it is determined in step 104 that less than the predetermined number of requests have been received within the predetermined period of time, method 100 may include one or more steps in addition to step 114. For example, and with reference to FIG. 5, in an implementation wherein step 104 comprises the substep 108 of comparing the identifier corresponding to the sender of the request to one or more stored identifiers, method 100 may include a step 116 of logging the request in a log stored in or on electronic memory device that is part of or accessible by the component configured to perform step 116, and that contains previously logged requests received from the sender of the request received in step 102 within the predetermined period of elapsed time. In a step 118, the total number of logged requests may then be compared to the predetermined number of requests. And if it is determined that the total number of logged requests is at least equal to the predetermined number of requests, then in a step 120, the identifier corresponding to the sender of the request may be recorded in an electronic memory device as an identifier corresponding to a sender from which at least the predetermined number of requests have been received within the predetermined period of time (and for or with which a communication session should not be established). More particularly, in step 120, the identifier may be recorded in a list or log of stored identifiers that the identifier of the sender is compared to in step 108 such that the next time a request is received from that particular sender within the predetermined period of time, the identifier of the sender will match a stored identifier and therefore a communications session may not be established. If, on the other hand, it is determined in step 118 that the total number of logged requests is less than the predetermined number of requests, method 100 may end or terminate or may alternatively proceed to another step.

As with step 104 described above, the particular component that is configured to perform steps 104 and, if applicable, steps 116-120, is implementation-dependent. For example, in an implementation wherein telematics unit 30 is the sender and call center 20 is the recipient of the request received in step 102, some or all of step(s) 114-120 may be performed by a suitably configured component of call center 20, for example and without limitation, server 82 alone or in combination with one or more other components (e.g., database 84) of call center 20. Alternatively, in an implementation wherein call center 20 is the sender and telematics unit 30 is the recipient, some or all of step(s) 114-120 may be performed by a suitably configured component of telematics unit 30, for example, processing device 52 alone or in combination with one or more other components of telematics unit 30 (e.g., cellular chipset 50). Accordingly, it will be appreciated that some or all of step(s) 114-120 may be performed by any number of components, and thus, the present disclosure is not intended to be limited to any particular component(s) for doing so.

If, contrary to the description immediately above, it is determined in step 104 that more than (or at least) the predetermined number of requests have been received from the sender within the predetermined period of time, method 100 may include one or more additional steps. For example, in the implementation illustrated in FIG. 2, method 100 may include a step 122 of simply disregarding the request, and therefore, no communication session is established and method 100 terminates or circles back to a prior step in the methodology, for example, step 102.

Additionally or alternatively, method 100 may include a step 124 of communicating a message to the sender of the request received in step 102 containing instructions for further action to be taken by the sender, the user (e.g., driver or passenger of the vehicle), or both. More particularly, in an embodiment, step 124 may comprise generating and communicating to the sender of the request a message that instructs the user to take certain action (e.g., dial a particular telephone number) if assistance is really required. This message may be displayed audibly and/or visually within the passenger cabin of the vehicle via, for example, the audio system 36 and/or visual display 38 of vehicle 12. Similarly, in another embodiment, step 124 may additionally or alternatively comprise generating and communicating a message that instructs the sender of the request (e.g., the telematics unit 30 or call center, as the case may be), as opposed to the user, to take certain action (e.g., call a certain telephone number, contact authorities, etc.). In either of the instances described above, step 124 may comprise redirecting the initial request received in step 102 to a predefined landing point, for example, VRS 88 of call center 20, that is configured to generate and communicate (e.g., play) a default, automated message, for example, "If this is a real problem, please call 555-555-5555."

Accordingly, it will be appreciated that any number of steps may be taken in the event that it is determined in step 104 that more than the predetermined number of requests have been received from the same sender within the predetermined period of elapsed time, including, but not limited to, those described above. It will be further appreciated that the step(s) taken in response to such determination serve(s) to at least limit the resources of, for example, call center 20 (e.g., live adviser(s)), that are devoted to requests received from senders that may send an excessive number of requests in a given period of time, and therefore, may be malfunctioning.

As with other steps of method 100, the particular component that is configured to perform step 122 and/or step 124 is implementation-dependent. For example, in an implementation wherein telematics unit 30 is the sender and call center 20 is the recipient of the request received in step 102, step(s) 122, 124 may be performed by a suitably configured component of call center 20, for example, server 82 alone or in combination with one or more other components (e.g., database 84) of call center 20. Alternatively, in an implementation wherein call center 20 is the sender and telematics unit 30 is the recipient, step(s) 122, 124 may be performed by a suitably configured component of telematics unit 30, for example, processing device 52 alone or in combination with one or more other components of telematics unit 30 (e.g., cellular chipset 50). Accordingly, it will be appreciated that step(s) 122, 124 may be performed by any number of components, and thus, the present disclosure is not intended to be limited to any particular component(s) for doing so.

In addition to the steps described above, in at least certain implementations method 100 may further comprise one or more additional steps, some or all of which may be optional. For example, in at least some implementations, method 100 may include a step 126 of processing the electrical signal(s) received in step 102 to determine or extract location information relating to the vehicle, which, in an embodiment, may comprise, for example, GPS coordinates acquired from the GPS of the vehicle (e.g., GPS 40 of vehicle 12). In such an embodiment, method 100 may further include a step 128 of using the location information from step 126 to determine at least an approximate location of the vehicle using the location information from step 126. The approximate location of the vehicle may be used to, for example, dispatch the owner of the vehicle, emergency personnel, or other individuals to the vehicle to, for example: disable the telematics unit or take other action to prevent further requests from being inadvertently and unintentionally sent; confirm that assistance is not, in fact, needed; and/or to take other action. One or both of steps 126, 128 may be performed at any point in time following step 102. For example, in an embodiment, step(s) 126, 126 is/are performed following step 102 and either before, after, or simultaneously with step 104. In another embodiment, step(s) 126, 128 may be performed after step 104 and either before, after, or simultaneously with step(s) 122, 124. Accordingly, the present disclosure is not limited to step(s) 126, 128 being performed in any particular sequence relative to the other steps of method 100. Additionally, in an embodiment, steps 126, 128 are performed by a suitably configured component of either telematics unit 30 or call center 20, depending on the particular implementation, which may be the same component(s) that perform steps 114, 122, and/or 124 described above.

It will be appreciated in view of the above that in at least certain implementations (i.e., those in which step 104 of method 100 includes, for example, substep 108), another aspect of method 100 relates to maintaining a current log or list of senders from which at least a predetermined number of requests to establish a communication session have been received within a predetermined period of elapsed time; in other words, a list of senders for or with which communication sessions should not be established. Accordingly, in such implementations, method 100 may include one or more steps in addition to those described above that may be performed at least substantially simultaneously or sequentially with respect to one or more other steps of method 100.

Figure 6:
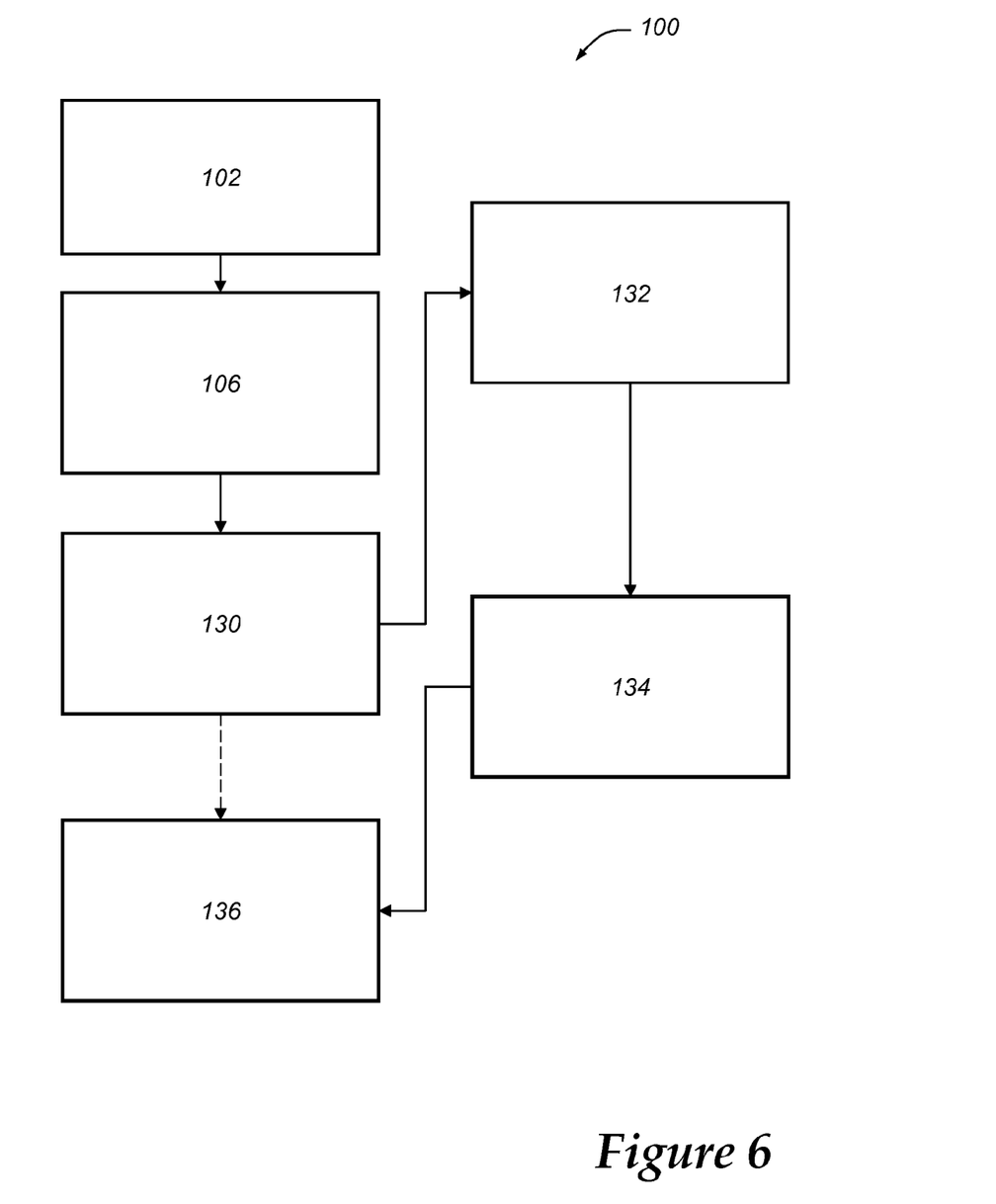

For example, and with reference to FIG. 6, method 100 may include a step 130 of determining whether a particular number of requests (e.g., the predetermined number of requests described above) to establish a communication session between the telematics unit and the remote facility have been received from the sender within a predetermined period of elapsed time (e.g., the predetermined period of elapsed time described above). This step may be performed after a request is received from the sender in step 102 and a step (e.g., step 106) of processing the electrical signal(s) received in step 102 to determine an identifier corresponding to the sender of the request. In an embodiment, step 130 may comprise a substep 132 of logging the request in a log stored in or on electronic memory device that is part of or accessible by the component configured to perform step 130, and that contains previously logged requests received from the sender corresponding to the identifier determined in step 106 within the predetermined period of elapsed time. The total number of logged requests may then be compared to the predetermined number of requests in a substep 134. And if it is determined in substep 134 that the number of logged requests is less than the predetermined number of requests, then it can be further determined that less than the predetermined number of requests have been received from the sender within the predetermined period of elapsed time. Conversely, if it is determined in substep 134 that the number of logged requests equals (or, in an embodiment, equals or exceeds) the predetermined number of requests, it can be further determined that at least the predetermined number of requests have been received from the sender within the predetermined period of elapsed time.

If it is determined is step 130 that at least the predetermined number of requests have, in fact, been received within the predetermined period of elapsed time, then method 100 may further include a step 136 of identifying the sender of the request as a sender for or with which communication sessions should not be established, and recording/storing the identifier corresponding to that sender in an electronic memory device, and a data structure stored in or on the electronic memory device, in particular, with other identifiers that have previously been identified as corresponding to senders for or with which communication sessions should not be established. As such, the next time a request is received from that particular sender within the predetermined period of elapsed time, and the identifier corresponding to that sender is compared to a list or log containing stored identifiers in substep 108, the identifier will match a stored identifier and therefore a communications session may not be established. Alternatively, if it is determined in step 130 that less than the predetermined number of requests have been received from the sender within the predetermined period of time, then in at least certain embodiments, the corresponding identifier is not recorded and method 100 may proceed to a subsequent step or end/terminate.

In an embodiment or implementation wherein an identifier is stored/recorded in step 136, method 100 may further include a step (not shown) of clearing the identifier from the electronic memory device (or at least the data structure within which it was stored in step 136) following the occurrence of a prescribed event. In an embodiment, the prescribed event that triggers the clearing of the identifier comprises the expiration of a timer (or the elapsing of a predetermined length of time from when the identifier was stored). More particularly, after the identifier is stored/recorded in step 136, a timer may be activated that counts down from or up to a certain increment of time, which may any increment of time from a matter of seconds to a matter of hours (e.g., in one non-limiting example, the increment is "24 hours," though other increments of time may certainly be used instead). When the timer reaches zero or otherwise expires, the identifier may be removed from the list or log of stored identifiers. In other embodiments, different event occurrences may be used to trigger the clearing of an identifier from the list or log of stored identifiers, accordingly, the present disclosure is not intended to be limited to any particular event(s). One reason for periodically removing identifiers in the manner described above is to prevent legitimate requests from being disregarded by the recipient of the initial request in step 102 after a certain period of time has elapsed.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of processing requests to establish wireless communication sessions in a mobile vehicle communications system, comprising:
   receiving a request to establish a communication session between a telematics unit of a vehicle and a remote facility, wherein the request takes the form of one or more electrical signals;
   determining whether less than a predetermined number of requests to establish a communication session between the telematics unit and the remote facility have been received from the sender of the request within a predetermined period of time; and
   when it is determined that less than the predetermined number of requests have been received from the sender within the predetermined period of time, establishing a communication session between the telematics unit and the remote facility.

2. The method of claim 1, wherein when it is determined that at least the predetermined number of requests have been received from the sender within the predetermined period of time, the method further comprises disregarding the request and not establishing a communication session between the telematics unit and the remote facility.

3. The method of claim 1, wherein when it is determined that at least the predetermined number of requests have been received from the sender within the predetermined period of time, the method further comprises communicating a message to the sender of the request containing instructions for further action to be taken by the sender, a user, or both.

4. The method of claim 1, further comprising processing the received electrical signal(s) to determine an identifier corresponding to the sender of the request, and wherein the determining step comprises:
   comparing the identifier to one or more identifiers stored in an electronic memory device, the stored identifiers corresponding to one or more senders from which at least the predetermined number of requests to establish a communication session have been received within the predetermined period of time; and
   determining that less than the predetermined number of requests have been received from the sender when the identifier corresponding to the sender does not match one of the stored identifiers.

5. The method of claim 4, wherein if the identifier of the sender does not match one of the stored identifiers, the method further comprises:
   logging the request in an electronic memory device;
   determining, as a result of the received request, whether at least the predetermined number of requests have been received from the sender within the predetermined period of time; and
   when it is determined that, as a result of the received request, at least the predetermined number of requests have been received within the predetermined period of time, recording the identifier in an electronic memory device as an identifier corresponding to a sender from which at least the predetermined number of requests have been received within the predetermined period of time.

6. The method of claim 1, further comprising logging the request in an electronic memory device, and wherein the determining step comprises determining whether less than the predetermined number of requests has been received based on the number of logged requests received from the sender.

7. The method of claim 1, further comprising:
   processing the received electrical signal(s) to determine location information relating to the vehicle; and
   determining a location of the vehicle based on the location information.

8. The method of claim 1, wherein establishing the communication session comprises sending one or more electrical signals representative of a dynamic number allocation to the sender of the request.

9. A system for processing requests to establish wireless communication sessions in a mobile vehicle communications system, comprising:
   an electronic processor having an electrical input for receiving a request to establish a communication session between a telematics unit and a remote facility, wherein the request takes the form of one or more electrical signals; and an electronic memory device electrically coupled to the electronic processor and having instructions stored therein, wherein the processor is configured to access the memory device and execute the instructions stored therein such that it is operable to:

determine whether less than a predetermined number of requests to establish a communication session between the telematics unit and the remote facility have been received from the sender of the request within a predetermined period of time; and when it is determined that less than the predetermined number of requests have been received from the sender within the predetermined period of time, establish a communication session between the telematics unit and the remote facility.

10. The system of claim 9, wherein when it is determined that at least the predetermined number of requests have been received from the sender within the predetermined period of time, the processor is operable to disregard the request and to not establish a communication session between the telematics unit and the remote facility.

11. The system of claim 9, wherein when it is determined that at least the predetermined number of requests have been received from the sender within the predetermined period of time, the processor is operable to communicate a message to the sender of the request containing instructions for further action to be taken by the sender, a user, or both.

12. The system of claim 9, wherein the processor is further operable to:

process the received electrical signal(s) to determine an identifier corresponding to the sender of the request, and to determine whether less than the predetermined number of requests have been received from the sender within the predetermined period of time by:

comparing the identifier to one or more identifiers stored in an electronic memory device, the stored identifiers corresponding to one or more senders from which at least the predetermined number of requests to establish a communication session have been received within the predetermined period of time; and determining that less than the predetermined number of requests have been received from the sender when the identifier corresponding to the sender does not match one of the stored identifiers.

13. The system of claim 12, wherein if the identifier of the sender does not match one of the stored identifiers, the processor is further operable to:

log the request in the electronic memory device;

determine, as a result of the received request, whether at least the predetermined number of requests have been received from the sender in the predetermined period of time; and when it is determined that as a result of the received request, at least the predetermined number of requests have been received within the predetermined period of time, record the identifier in the electronic memory device as an identifier corresponding to a sender from which at least the predetermined number of requests have been received within the predetermined period of time.

14. The system of claim 9, wherein the processor is further operable to log the request in the electronic memory device and to determine whether less than the predetermined number of requests have been received based on the number of logged requests received from the sender.

15. The system of claim 9, wherein the processor is further operable to:

process the received electrical signal(s) to determine location information relating to the vehicle; and determine a location of the vehicle based on the location information.

16. The system of claim 9, wherein the processor is operable to establish the communication session by sending one or more electrical signals representative of a dynamic number allocation to the sender of the request.

17. A method of managing requests to establish wireless communication sessions in a mobile vehicle communications system, comprising:

receiving a request to establish a communication session between a telematics unit and a remote facility, wherein the request takes the form of one or more electrical signals;

processing the received electrical signal(s) to determine an identifier corresponding to the sender of the request;

determining whether a particular number of requests to establish a wireless communication session between the telematics unit and the remote facility have been received from the sender within a particular period of time; and when it is determined that the particular number of requests have been received from the sender within the particular period of time, identifying the sender as a sender for which communication sessions should not be established and storing the identifier corresponding thereto in an electronic memory device.

18. The method of claim 17, wherein storing the identifier in an electronic memory device comprises storing the identifier in a data structure along with other identifiers corresponding to senders from which the particular number of requests have been received within the particular period of time.

19. The method of claim 17, further comprising clearing the identifier corresponding to the sender from the electronic memory device following the occurrence of a prescribed event.

20. The method of claim 19, wherein the occurrence of a prescribed event comprises the expiration of a timer.

* * * * *